(12) United States Patent
Purcell et al.

(10) Patent No.: US 8,217,935 B2
(45) Date of Patent: Jul. 10, 2012

(54) APPARATUS AND METHOD FOR RAY TRACING WITH BLOCK FLOATING POINT DATA

(75) Inventors: Stephen Purcell, Mountain View, CA (US); Ryan R. Salsbury, San Francisco, CA (US); James Alexander McCombe, San Francisco, CA (US); Sean Matthew Gies, San Francisco, CA (US)

(73) Assignee: Caustic Graphics, Inc., San Francisco, CA (US)

( * ) Notice: Subject to any disclaimer, the term of this patent is extended or adjusted under 35 U.S.C. 154(b) by 1117 days.

(21) Appl. No.: 12/059,559

(22) Filed: Mar. 31, 2008

(65) Prior Publication Data

US 2009/0244058 A1 Oct. 1, 2009

(51) Int. Cl.
*G06T 15/30* (2006.01)
(52) U.S. Cl. ........................................... 345/423
(58) Field of Classification Search .................. None
See application file for complete search history.

(56) References Cited

U.S. PATENT DOCUMENTS

| | | | | |
|---|---|---|---|---|
| 5,839,100 | A * | 11/1998 | Wegener | 704/220 |
| 5,933,146 | A | 8/1999 | Wrigley | |
| 7,012,604 | B1 | 3/2006 | Christie et al. | |
| 7,289,118 | B2 | 10/2007 | Schmittler et al. | |
| 2001/0050682 | A1 * | 12/2001 | Deering et al. | 345/420 |
| 2007/0132754 | A1 | 6/2007 | Reshetov et al. | |
| 2008/0150944 | A1 | 6/2008 | Reshetov et al. | |

FOREIGN PATENT DOCUMENTS

WO WO 2008/037599 4/2008

OTHER PUBLICATIONS

"Fixed Point Hardwae Ray Tracing", Aug. 23, 2007 by Johannes Hanika.*
Johannes Hanika, "Fixed Point Hardware Ray Tracing", Aug. 23, 2007, pp. 1-61.*
Johannes Hanika, "Fixed Point Hardware Ray Tracing", Aug. 23, 2007, pp. 3-61.*
P. H. Christensen, J. Fong, D. M. Laur and Dana Batali, "Ray Tracing for the Movie 'Cars'," IEEE Symposium on Interactive Ray Tracing, 2006, pp. 1-6.

(Continued)

*Primary Examiner* — Said Broome
*Assistant Examiner* — Janice Kau
(74) *Attorney, Agent, or Firm* — Michael S. Garrabrants; ArtesynIP, Inc.

(57) ABSTRACT

Systems and methods include high throughput and/or parallelized ray/geometric shape intersection testing using intersection testing resources accepting and operating with block floating point data. Block floating point data sacrifices precision of scene location in ways that maintain precision where more beneficial, and allow reduced precision where beneficial. In particular, rays, acceleration structures, and primitives can be represented in a variety of block floating point formats, such that storage requirements for storing such data can be reduced. Hardware accelerated intersection testing can be provided with reduced sized math units, with reduced routing requirements. A driver for hardware accelerators can maintain full-precision versions of rays and primitives to allow reduced communication requirements for high throughput intersection testing in loosely coupled systems. Embodiments also can include using BFP formatted data in programmable test cells or more general purpose processing elements.

20 Claims, 6 Drawing Sheets

OTHER PUBLICATIONS

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

E. Groller and W. Purgathofer, "Coherence in Computer Graphics," Institute for Computer Graphics, Technical, University Vienna, Vienna, Austria, In Transactions on Information and Communications Technologies, vol. 5, 1993 WIT Press.

Eric Larsen, Stefan Gottschalk, Ming C. Lin, and Dinesh Manocha, "Fast Distance Queries with Rectangular Swept Sphere Volumes," Proceedings of IEEE International Conference on Robotics and Automation, San Francisco, CA, 2000, vol. 4, pp. 3719-3726.

Masataka Ohta and Mamoru Maekawa, "Ray-bound tracing for perfect and efficient anti-aliasing," The Visual Computer: International Journal of Computer Graphics, vol. 6, issue 3, Springer Berlin / Heidelberg, May 1990, pp. 125-133.

M.L. Anido, N. Tabrizi, H. Du, M. Sanchez-Elez M and N. Bagherzadeh, "Interactive Ray Tracing Using a SIMD Reconfigurable Architecture," Proceedings of the 14th Symposium on Computer Architecture and High Performance Computing, 2002, pp. 20-28.

A.J. van der Ploeg, "Interactive Ray Tracing, the replacement of rasterization?" B.Sc. thesis, VU University Amsterdam, The Netherlands, Dec. 2006. (Available at http://www.cs.vu.nl/~kielmann/theses/avdploeg.pdf, last visited on Mar. 31, 2008.).

H. Du, M. Sanchez-Elez, N. Tabrizi, N. Bagherzadeh, M.L. Anido and M. Fernandez, "Interactive Ray Tracing on Reconfigurable SIMD MorphoSys," Proceedings of the Design, Automation and Test in Europe Conference and Exhibition, 2003, Asia and South Pacific Jan. 21-24, 2003, pp. 471-476.

Johannes Hanika, "Fixed Point Hardware Ray Tracing," Diplomarbeit, Ulm University, Germany, 2007. (Available at http://www.uni-ulm.de/fileadmin/website_uni_ulm/iui.inst.100/institut/mitarbeiter/jo/dreggn2.pdf, last visited on Mar. 31, 2008.).

J. Hanika and A. Keller, "Towards Hardware Ray Tracing using Fixed Point Arithmetic," IEEE/EG Symposium on Interactive Ray Tracing, 2007, Sep. 10-12, 2007, Ulm, Germany, pp. 119-128.

M. Sanchez-Elez, H. Du, N. Tabrizi, Y. Long, N. Bagherzadeh and M. Fernandez, "Algorithm Optimizations and Mapping Scheme for Interactive Ray Tracing on a Reconfigurable Architecture," Computers & Graphics 27(5), 2003, pp. 701-713.

Jeffrey A. Mahovsky, "Ray-Tracing with Reduced-Precision Bounding Volume Hierarchies," PhD thesis, University of Calgary, Alberta, Canada, 2005. (Available at http://pages.cpsc.ucalgary.ca/~brosz/theses/PhD%20Thesis%20-%202005%20-%20Jeffrey%20Mahovsky%20-%20Ray%20Tracing%20with%20Reduced-Precision%20Bounding%20Volume%20Hierarchies.pdf, last visited on Mar. 31, 2008).

J. Fender and J. Rose, "A High-Speed Ray Tracing Engine Built on a Field-Programmable System," Proceedings of the 2003 IEEE International Conference on Field-Programmable Technology (FPT), Dec. 15-17, 2003, pp. 188-195.

* cited by examiner

APPARATUS AND METHOD FOR RAY TRACING WITH BLOCK FLOATING POINT DATA

BACKGROUND

1. Field

The present invention generally relates to rendering two-dimension representations from three-dimensional scenes, and more particularly to using ray tracing for accelerated rendering of photo-realistic two-dimensional representations of scenes.

2. Description of Related Art

Rendering photo-realistic images with ray tracing is well-known in the computer graphics arts. Ray tracing is known to produce photo-realistic images, including realistic shadow and lighting effects, because ray tracing models the physical behavior of light interacting with elements of a scene. However, ray tracing is also known to be computationally intensive, and at present, even a state of the art graphics workstation requires a substantial amount of time to render a complicated scene using ray tracing.

Ray tracing usually involves obtaining a scene description composed of geometric primitives, such as triangles, that describe surfaces of structures in the scene, and modeling how light interacts with primitives in the scene by tracing light rays in the scene. A ray is a vector of virtual light with an origin and a direction in 3-space.

For example, a scene may comprise a car on a street with buildings on either side of the street. The car in such a scene may be defined by a large number of triangles (e.g., 1 million triangles) that approximate a continuous surface. A camera position from which the scene is viewed is defined. A ray cast from the camera is often termed a primary ray, while a ray cast from one object to another, for example, to enable reflection is often called a secondary ray. An image plane of a selected resolution (e.g., 1024×768 for an SVGA display) is disposed at a selected position between the camera and the scene.

A principal objective of ray tracing is to determine a color and intensity for each pixel of the image plane, such that this image can thereafter be displayed on a monitor, for example. In the physical world, viewing such a scene from the camera's perspective would result in light rays reaching the camera that owe their existence to one or more light sources, including diffuse and directed light sources. In the physical world, these light sources project light energy into the scene, and this light energy is transmitted, diffracted, reflected, and/or absorbed according to the types of materials that the light contacts, and the order in which they are contacted, during its journey from light source to the camera. This process is what ray tracing attempts to duplicate.

Although the physical world operates by light energy being traced from a source to the camera, because only a small portion of the light generated by a source arrives at the camera, it has been recognized that rays, for most circumstances, should be traced from the camera back to determine intersections with light sources, instead.

A simplistic ray tracing algorithm involves casting one or more rays from the camera through each pixel of the image into the scene. Each ray is then tested against each primitive composing the scene to identify a primitive which that ray intersects, then it is determined what effect that primitive has on the ray, for example reflecting and/or refracting it. Such reflection and/or refraction causes the ray to proceed in a different direction, and/or split into multiple secondary rays, which can take different paths. All of these secondary rays are then tested against the scene primitives to determine primitives they intersect, and the process recursively continues until the secondary (and tertiary, etc.) ray terminates by, for example, leaving the scene, or hitting a light source. While all of these ray/primitive intersections are being determined, a tree mapping them is created. After a ray terminates, the contribution of the light source is traced back through the tree to determine its effect on the pixel of the scene.

As can be readily understood, the computational complexity of testing 1024×768 (for example) rays for intersection with millions of triangles is computationally expensive—and such ray numbers do not even account for all of the additional rays spawned as a result of material interaction with intersecting rays). Since a ray traverses a scene in a straight line, it has been understood that the "brute force" testing of each ray against each primitive is costly, and by testing a ray first against sub-portions of the primitives, a group of fewer primitives can be identified to test for intersection. Many ways to provide these sub-portions have been proposed and generally are referred to as acceleration structures.

Implicit in the above overview is that each primitive, and acceleration structure has a defined position and extent in the scene. Each ray also must have a specified origin, and a direction. Generally, more accuracy in specifying these items is thought to provide a better ray tracing result, in that more accuracy can allow for greater precision in intersection testing. Many general purpose processors are used to implement ray tracing, and these processors provide full-precision IEEE floating point units, and ray tracing software can benefit from this built-in floating point capability.

Using fixed point math in ray tracing also has been considered. Fixed integer math used in ray tracing generally calls for sub-dividing an extent of a scene into equally sized subdivisions of a size that depends on an available number of bits in the integer format being used, and a size of the scene being rendered. Then, positions of objects in the scene and ray data are quantized to a nearest number representable within the number of bits provided. Fixed point arithmetic allows for a much smaller range of representable numbers than floating point arithmetic. Fixed point arithmetic also generally involves an analysis of a particular scene to be rendered, such that the scene can be adapted to fixed point representation in an intelligent way, and generalizing the use of fixed point arithmetic to full-resolution problems and for more arbitrary scenes may be difficult.

SUMMARY

Aspects of the invention include a method of intersection testing for ray tracing, that comprises receiving ray data defining a ray. The method also comprises receiving geometric shape data including 3-D positional information for the shape represented by block floating point format data comprising a plurality of significant sharing a common exponent. The method also comprises testing the ray for intersection with the geometric shape based on the received ray data and the geometric shape data, and outputting an intersection result in response to the testing indicating a possible intersection of the ray with the geometric shape. In other aspects ray data also can be provided in a block floating point format additionally or instead of the geometric shape data.

The geometric shapes can include acceleration data and primitives, including spheres, triangles, axis-aligned bounded boxes, and the like. A higher precision floating point format representation of the geometric shapes can be maintained, for example, in a system memory and converted to provide the block floating point format representation. Such conversion can be done on a host processor, or in another resource.

Other aspects can include a ray tracing system comprising a converter operable to receive geometric shape data, which defines at least one point in 3-D space with three floating point components expressed as three exponents and three significant, and converts the geometric shape data for the at least one point into geometric shape data comprising three significant and one exponent shared among the three significant. The system also comprises an intersection testing resource operable to receive ray data defining a ray to be intersected tested with the geometric shape, to receive the converted geometric shape data, and to determine an intersection test result based on the ray data and the converted geometric shape data.

Still further aspects include test cells and/or other functional units that operate for intersection testing of a ray with geometric shapes, comprising an interface for receiving data defining a geometric shape with a plurality of attributes. At least one of the attributes is defined by data comprising a first exponent shared among a first plurality of FP significant. The test cell interface also is operable for receiving data defining a ray to be tested for intersection against the geometric shape, where the origin of the ray is defined with one or more second exponents and a second plurality of floating point significant.

The test cell also comprises a normalizer operable to identify a testing exponent based on the first exponent and the one or more second exponents, and to round one or more of the first plurality of floating point significant and the second plurality of floating point significant based on a value of the testing exponent; and intersection test logic implementing an algorithm for testing the ray for intersection with the geometric shape, the intersection test logic using the testing exponent, and the rounded one or more of the first plurality of floating point significant and the second plurality of floating point significant

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention. For clarity in description, data for a certain type of object, e.g., a primitive (e.g., coordinates for three vertices of a triangle) is described simply as the object itself, rather than referring to the data for the object.

Introduction

A 3-D scene is converted into a 2-D representation for display. In an example conversion, a camera position (can be diffuse) is selected from which the scene is to be viewed. The camera position frequently represents a location of a viewer of the scene (e.g., a gamer, a person watching an animated film, etc.) The 2-D representation is usually at a plane location between the camera and the scene, such that the 2-D representation comprises an array of pixels at a desired resolution. Rays are instantiated to pass through the image plane at known locations. These rays are tested for intersection with primitives composing the scene. Because the scene will have many primitives, acceleration structures are often used to provide ways to eliminate portions of the scene primitives that do not need to be tested for a given ray.

Usually, these acceleration structures comprise geometric shapes that bound portions of scene primitives or scene space, and intersection testing of rays with those geometric shapes is conducted to determine whether further testing with the boundary of that geometric shape is required.

In order to determine whether a primitive and/or an acceleration structure is intersected by a given ray, the primitive, the acceleration structure, and the ray all need to have locations and other information (e.g., radius, direction, etc.) specified in the scene.

Many ray tracing systems use IEEE compliant floating point (FP) math, as provided in many modern CPUs, to represent such locations. For example, modern CPUs can have SIMD single-precision FP units that can execute an instruction on 4 single-precision floating point numbers at a time. Here, any FP implementation that has at least single-precision floating point accuracy is termed "full-precision" FP, and would include for example, both single and double precision FP. In general, FP number presentation provides a significand (often also called a mantissa) having a number of bits, and an exponent. The significand is normalized to have no more than 1 significant bit to the left of the decimal point (which "floats"), and the exponent is adjusted to scale the significand appropriately. It is conventional to consider that a floating point number, S, is defined (aside from sign bit) by $1.f \cdot 2^{\epsilon-b}$ where f is a fraction composing the significand of S (where the "1" is usually implied, given normalization of the FP number), and $\epsilon$ is an exponent value biased by b. The sign bit establishes whether the number is positive or negative, and if negative numbers are not of interest for a given purpose then the sign bit would not be required. In single precision IEEE format, the significand comprises an unsigned 23 bit value.

By way of further explanation, in many computer graphics applications and implementations, triangles are used as a shape for a primitive, as they offer a variety of well-known advantages for producing wire frame models of scenes to be rendered. A triangle is composed of 3 vertices, which each define a point 3-D space. A point in 3-D space can be represented using three independent variables. The XYZ coordinate system represents the familiar conventional independent variables of X, Y, and Z and will be used herein. However, any set of three independent variables can represent a position in 3-D space, and fits within the examples and other aspects described herein.

Considering a simple location in 3-D space (e.g., a vertex), as an example, a vertex can be described relative to a scene origin, which also is a defined point for a given scene in 3-D space. Since the scene origin and vertex are relatively positioned in 3-D space, 3 variables are required to fully specify their relative location. One way to specify such relative location is to specify a distance between origin and vertex location in each of 3 directions, which generally are mutually orthogonal.

Thus, each number describing a vertex can represent a distance from the scene origin in one of three directions, and collectively, the vertex is fully specified by three FP numbers. To that end, Table 1 presents a single-precision floating point (FP) representation of a vertex with three FP numbers, each comprising a respective exponent and a respective significand and each being 32 bits (single precision) long.

TABLE 1

| Exponent | Significand X | Exponent | Significand Y | Exponent | Significand Z |
|---|---|---|---|---|---|
| 32 bits | | 32 bits | | 32 bits | |
| | | 96 bits | | | |

Figure 1:
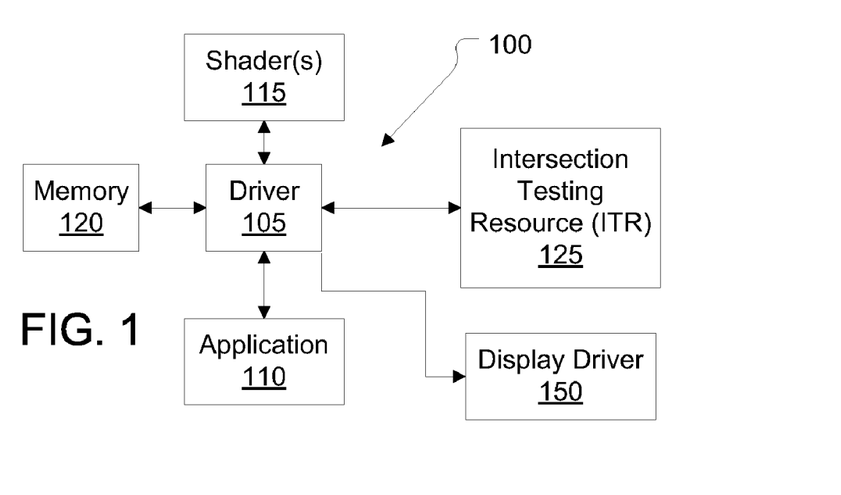
FIG. 1 and FIG. 2 illustrate aspects of systems in which block floating point ray tracing aspects described herein may be implemented.
Figure 2:
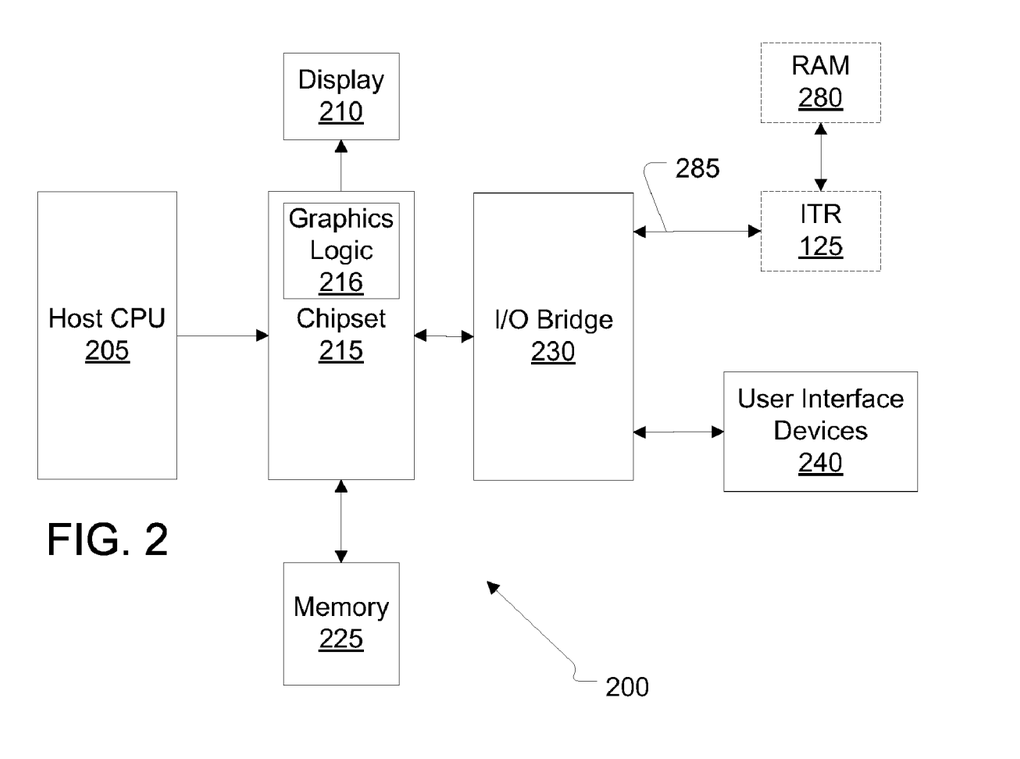

By contrast with full-precision FP representations, example systems and methods according to aspects presented herein use a number format to represent scene locations of rays, primitives, and acceleration data that allows more efficient memory use than full-precision FP formats, while also maintaining suitability for large scene ray tracing, with widely dispersed objects. FIGS. 1-2 illustrate logical and physical organizations of an exemplary rendering system 100, and aspects of rendering system and its configuration are described more particularly with respect to later figures.

FIG. 1 presents a logical organization of a rendering system 100. System 100 comprises a driver 105 that interfaces with an application 110 that uses rendering services provided through driver 105. Driver 105 can access a memory 120, and provide data to and receive data from shaders 115 and to display driver 150. Driver also provides data to and receives data from an intersection testing resource 125. Driver 105 and shaders 115 are often programs running on a general purpose processor, while intersection testing unit 125 can include specialized hardware for performing parallelized intersection testing, as will be described below.

For example, FIG. 2 illustrates hardware 200 aspects for the rendering system 100 of FIG. 1. A Host CPU 205 provides computation resources for executing code for driver 105, shaders 115 and aspects of display driver 150. Host CPU 205 uses a chipset 215, which may comprise graphics logic 216 that also may provide other rendering services to application 110, as well as interfacing with display driver 150. Chipset 215 communicates with an I/O bridge 230, which in turn communicates with intersection testing resource 125 and with user interface devices 240 (e.g., mice, keyboards, joysticks, trackballs, etc.) Chipset 215 also communicates with a system memory 225, which provides working memory for various code running on CPU 205 (memory 120 can be a virtual memory comprising portions of memory 225). Hardware 200 provides a high-level context useful in describing various inventive aspects, but any of a variety of different computer systems can be used, and many substitutions and changes could be made with hardware 200, including, for example, provision of one or more discrete graphics cards, integration of the I/O bridge 230 into chipset 215, and/or integration of the chipset into CPU 205. The system 100 and the configuration of hardware 200 can include, in one aspect, a computer executing a software driver for interfacing with the intersection testing resource 125 and with application(s) using rendering services.

The operation of intersection testing resource 125, which receives rays, primitives, and acceleration structures from the driver for use in determining ray/primitive intersection pairs, which are returned to the driver, will be described with respect to FIG. 3, following an explanation of how these forms of data can be represented according to aspects herein.

Data Used in Scene Rendering/Intersection Testing

The following paragraphs describe aspects and examples of how primitives, acceleration structures, and rays may be represented for use in systems according to FIGS. 1 and 2.

Table 2, below, shows a data structure according to an example block floating point (BFP) representation of a vertex. In this BFP representation, the point in 3-D space represented by the vertex is represented by an exponent shared among an X distance, a Y distance, and a Z distance from a defined origin (again, with the example XYZ coordinate system, although more general applicability exists). The data structure also includes a separate significand for each of the X, Y, and Z distances. Thus, as compared to a full-precision floating point representation, each X, Y, and Z distance does not include a separate exponent. Also, in one aspect, each significand (18 bit integer) for each of X, Y, and Z in Table 2 is represented in twos-complement, although a sign bit with an unsigned integer can also be used. Further, rather than the typical IEEE bias selection of 149, a bias applied to the shared exponent can be set at 143.

TABLE 2

| Exponent Shared | Significand X | Significand Y | Significand Z |
|---|---|---|---|
| 8 bits | 18 bits | 18 bits | 18 bits |
| | | 62 bits | | |

The representation of a vertex in this format is a deviation from accepted practice, which calls for separate normalization of each floating point number (i.e., X, Y, and Z) such that each FP number has only one significant digit to the left of the point. Normalization provides better precision within the available bits. Practically, to effect the proposed vertex representation, some of the FP numbers representing a given scene element will be denormalized, resulting in a loss of precision in representing those numbers.

For example, assuming that a vertex has the following location with respect to an origin, [$1.0437562 \times 10^{\wedge}6$, $1.7463000 \times 10^{\wedge}9$, $1.0480000 \times 10^{\wedge}13$] (using base 10 here, for convenience, but it would be understood that base 2 is used generally). Also, this example significand has 7 significant digits (not including the implied 1 to the left of the decimal). There is an exponent difference between the X value ($10^{\wedge}6$) and both the Y and Z values ($10^{\wedge}9$ and $10^{\wedge}13$, respectively). Reformulating these normalized FP numbers into a BFP representation requires denormalization of at least two of the numbers.

These numbers can be denormalized in different ways. One possibility is to reduce the exponent of the larger numbers to be equal to that of the smallest number, and then shifting the significant of the larger numbers to reflect the changes in exponents. This way is less desirable than the other possibilities since it causes loss of more significant digits in the larger numbers (having shifted the decimal point to the left).

Another way is to adjust the smaller numbers to have an exponent equal to the largest number, and then shift the decimal point in their significant accordingly. Since this approach causes loss of least significant bits, this approach is preferable to the above method. Another alternative is to shift the smallest and largest numbers to an intermediate value, which also causes loss of some precision in the most significant bits of the larger number, which may be more of a concern than maintaining significance in the least significant digits of the smaller number.

Thus, in this example, a denormalized version of these floating point numbers could include selecting a shared exponent of 10^13, which would require denormalization of two numbers: 1.0437562×10^6 would become 0.0000001×10^13 and 1.7463000×10^9 would become 0.0001746×10^13. As can be seen, a given number, when compared only to its pre-adjustment value, can change dramatically in precision when denormalized.

In preferred applications of embodiments of aspects described, a scene composed of primitives will be rendered using ray tracing, the primitives are defined with respect to a scene origin, and the scene will be viewed from a camera location approximately coincident with the scene origin. By locating the scene origin and the camera location in close proximity, defining scene primitives with a block floating point format allows a point in space defined by 3 spatial components sharing a primitive to behave, for precision in specification of position, like a radial coordinate system. Such behavior allows higher precision for points closer to the origin than for those farther away. Especially in systems where it is desired to perform many intersection tests in parallel, with many rays and/or geometric shapes, BFP provides a precision tradeoff in favor of reduced computation requirements, reduced bandwidth, and memory requirements that can prove beneficial.

BFP Primitives (e.g., Triangles)

The present example focuses on triangular primitives, although from these disclosures, it will be apparent that other primitives can be represented according to the teachings disclosed here. Triangles are usually stored/represented in triangle strips, such that vertices of one triangle also form vertices for another. Table 3 presents a floating point representation of 3 triangles, where each FP numbers represent respective distances from a scene origin in each of the XYZ directions for each of three vertices (i.e., nine FP numbers of 32 bits total each). The first two vertices specify a first line, and then the next two vertices specify two triangles, using the first two vertices. An implied build order can be used to determine which vertices will be grouped to form triangles. Thus, to specify the first two triangles in this example, full-precision floating point would be expected to use 384 bits (see Table 3, below), and since each pair of vertices that follows can specify two more triangles, the average to represent a triangle would be expected to gradually converge on 96 bits (the amount of memory to represent one vertex). Different processing systems can store data differently, and this example is not to imply that a full-precision format may end up using more or fewer bits in some implementations.

A first example BFP triangle representation, as shown in Table 4 below, includes representing the directional components of a vertex with a shared exponent and respective separate significant (i.e., each of the X, Y, and Z components are formatted so that they share an exponent and have separate significant). Then, for the example triangle strip implementation, where four vertexes represent two triangles (and each subsequent two vertexes represent two more triangles), the first two triangles are represented with 248 bits, for example, and the long-term convergence is that each subsequent triangle can be represented with 62 additional bits. In this representation each vertex has an exponent independent of exponents of other vertexes.

TABLE 4

|  | Shared Exponent | Significand | Significand | Significand |
| --- | --- | --- | --- | --- |
| Vertex 1 | $E_1$ | $X_1$ | $Y_1$ | $Z_1$ |
| Vertex 2 | $E_2$ | $X_2$ | $Y_2$ | $Z_2$ |
| Vertex 3 | $E_3$ | $X_3$ | $Y_3$ | $Z_3$ |
| Vertex 4 | $E_4$ | $X_4$ | $Y_4$ | $Z_4$ |
|  | 8 bits each | 18 bits each | 18 bits each | 18 bits each |
|  | 32 bits | 72 bits | 72 bits | 72 bits |
|  | 248 bits |  |  |  |

In a representation according to Table 4, each vertex can be stored in 2 32 bit words. A memory format for 4 byte (32 bit) reads from a memory storing vertex data can include storing in one 32 bit segment a portion of a first significand (e.g., $Y_1$) a second significand (e.g., $Z_1$), and the exponent, and in a second 32 bit segment, storing the remainder of the first significand, and a third significand (e.g., $X_1$). Other data that can be stored in the 32 bit segment include an opacity flag and a termination flag shared between consecutive pairs of vertexes. The termination flag can be used in some examples to indicate an end of a series a triangles bounded by an element of geometry acceleration data (described below).

Table 5, below, shows a second example format includes representing each component distance for each of the three vertices in BFP format, such that all the X distances share an exponent, all the Y distances share an exponent and all the Z distances share an exponent. Then, each component direction for each vertex is represented by an exponent that may be reasonably similar, because it would generally be expected that differences in values in the same dimension between different vertices of the same primitive would be fairly low (i.e., primitives are generally small). It would be expected that numbers more similar in value could be represented in BFP format with less loss of precision than widely divergent numbers. This BFP format may be appropriate for some implementations of ray tracing algorithms. However, by linking the exponent of different vertexes within a block of FP data, using triangle strips becomes more complicated. Also, the radial-coordinate like loss of precision for far-away, from a shared camera/scene origin, objects is based on sharing of an exponent among components of a vertex.

TABLE 3

|  | Significand | Exponent | Significand | Exponent | Significand | Exponent |
| --- | --- | --- | --- | --- | --- | --- |
| Vertex 1 | $X_1$ |  | $Y_1$ |  | $Z_1$ |  |
| Vertex 2 | $X_2$ |  | $Y_2$ |  | $Z_2$ |  |
| Vertex 3 | $X_3$ |  | $Y_3$ |  | $Z_3$ |  |
| Vertex 4 | $X_4$ |  | $Y_4$ |  | $Z_4$ |  |
|  | 32 bits each |  | 32 bits each |  | 32 bits each |  |
|  | 128 bits |  | 128 bits |  | 128 bits |  |
|  |  |  | 384 bits |  |  |  |

TABLE 5

|  |  | Significand |  | Significand |  | Significand |
|---|---|---|---|---|---|---|
| Vertex 1 | Shared X | $X_1$ | Shared Y | $Y_1$ | Shared Z | $Z_1$ |
| Vertex 2 | Exponent | $X_2$ | Exponent | $Y_2$ | Exponent | $Z_2$ |
| Vertex 3 |  | $X_3$ |  | $Y_3$ |  | $Z_3$ |
| Vertex 4 |  | $X_4$ |  | $Y_4$ |  | $Z_4$ |
|  | 8 bits | 16 bits each 64 bits | 8 bits | 16 bits each 64 bits | 8 bits | 16 bits each 64 bits |
|  |  |  | 216 bits |  |  |  |

A variation on these implementations is to use the same exponent for all components (i.e., x, y, and z) of more than one vertex in a series of vertexes, such as a series of vertexes forming a triangle strip. For example, the same exponent would be used both for all the components of four vertexes. Other bits can be included in actual implementations to enable additional functionality. For example, opacity bits can be specified for every other vertex, as well as indications of what triangles are bounded by an acceleration shape, for some implementations.

In this implementation, the significant sharing an exponent correspond to different vertices. If used with triangle strips, this format thus involves using the same exponent for a block of vertex data (e.g., data for the X direction) that spans a number of triangles. For example, in a triangle strip, a next triangle can be specified by two previous vertexes and an additional vertex, and so on for a subsequent triangle. Thus, each triangle to be intersection tested uses two vertices from another triangle and there is overlap in the shared exponent among the floating point values of these triangles. So, in one implementation, a triangle strip can be specified with one shared exponent, such that the strip may end when the exponent can not adequately represent a subsequent triangle. Then, a new strip can be started with another exponent that will be shared among vertexes of that strip, and so on.

If a string of these vertexes includes a shared exponent, then vertexes of a next triangle have the same exponent as those of a previous triangle. Thus, a range of values available between a first vertex in the block and the last vertex in the block is limited by the exponent that was selected or determined initially. So, if this approach is used, then as more vertexes share the same exponent, the available range of representable numbers may be an impediment. To avoid that impediment, an implementation according to this example can provide a way to update or change the exponent within a triangle strip or some other series of primitives that share vertexes.

Regarding how such strip data can be stored in memory, in an example implementation, vertex data, for example a triangle strip, is arranged sequentially in memory, such that an indication to repeat exponents for the next vertex can be included rather than repeating the exponent itself. For example, if vertexes are encoded as 16 bits each, then after the 16 bits for the last significand of a vertex is read, then the next bit can be a flag indicating repetition of the previous exponent for the components of the next vertex. Thus, in such an example, a given exponent can be repeated across components of a single vertex and across multiple vertexes. Using such an implementation can reduce memory usage for storing exponents. Also, in some test cell implementations, if multiple primitives are to be tested against a given ray, then having components of vertexes defining those multiple primitives can also reduce a number of normalization and rounding operations required in intersection testing, which can reduce an average number of computations required to intersection test a ray with a number of primitives. Such reduction can allow more efficient software and/or hardware implementation. Table 6 is an example of data included in a short triangle strip where an exponent is shared among components of vertexes and among vertexes.

TABLE 6

|  |  | Significand | Significand | Significand |
|---|---|---|---|---|
| Vertex 1 | Shared | $X_1$ | $Y_1$ | $Z_1$ |
| Vertex 2 | Exponent | $X_2$ | $Y_2$ | $Z_2$ |
| Vertex 3 |  | $X_3$ | $Y_3$ | $Z_3$ |
| Vertex 4 |  | $X_4$ | $Y_4$ | $Z_4$ |
|  | 8 bits | 16 bits each 64 bits | 16 bits each 64 bits | 16 bits each 64 bits |
|  |  | 200 bits |  |  |

From the above description, it can be understood that a BFP format can be applied to any of a variety of primitive types, other than triangles, since at the minimum, the components of a single point in space can be represented by an exponent shared among the components, and separate significand.

Geometry Acceleration Data

Geometry acceleration data (hereinafter referred to as GAD) can be used to approximate (or abstracting) boundaries for one or more primitives in a scene to accelerate intersection testing. GAD may include elements that each bound a collection of the primitives in the scene. GAD may include a number of distinct elements that can be interrelated to each other. For example, elements of GAD can be a plurality of spheres, where each sphere bounds a portion of geometry describing an aspect or portion of a scene to be rendered. Another useful type of GAD element is an Axis Aligned Bounding Boxes (AABBs), which bound portions of geometry within a volume enclosed by the box.

First addressing a spherical GAD element, a sphere can be defined at least in part by the data shown in Table 7, below, comprising an origin for the sphere in BFP format and a radius.

TABLE 7

| Sphere Origin | | | | |
|---|---|---|---|---|
| Exponent Shared | Significand x | Significand y | Significand z | Radius |
| 8 bits | 12 bits | 12 bits | 12 bits | 11 bits |

Spheres of the plurality can be interrelated with each other, such that after determining that a ray intersects the surface of a given sphere, one or more other spheres that also bound primitives of that intersected sphere can be identified for subsequent testing (usually, those next tested spheres bound fewer primitives, and intersection testing converges on a smaller set of primitives that are tested ultimately for intersection with the ray.) Information in a data structure for a sphere can define what geometric shape or shapes should be tested next. For example, a sphere data structure can include a memory location of a start of a sequence of sphere that are to be tested upon determining that the sphere tested is intersected. For example, spheres of such a sequence can bound subsets of primitives bounded by the intersected sphere, and by testing spheres of the sequence, smaller groups of primitives can be identified, which ultimately will be tested. In other cases, a sphere can include a reference to a memory location at a start of a sequence of primitives to be tested. A flag can be included to indicate whether spheres or primitives are referenced or indicated by a given sphere, which can be used by software or hardware. Other examples of GAD include kd-trees, octrees, sub-divisions of scene space, and the like. Data for such GAD elements also can be represented in BFP format based on disclosures herein, and a particular AABB example also is addressed below.

Now, aspects of AABB GAD elements are addressed. One way to express an AABB element is by specifying two vertexes forming one of the major diagonals of the box, for example, a top left corner and a bottom right corner. Because the bounding box is axis aligned the remaining 6 vertexes (corners) of the BB can be inferred from the positions of these two vertexes. Since AABBs can be specified by two vertexes, a series of AABBs can be stored similarly to storage of a series of triangle primitives. The ways in which AABB data can be specified in BFP format are also thus similar to BFP formats for triangle data, and examples include that each vertex is specified by a common exponent shared by three significant (like Table 4), multiple vertexes can have components sharing an exponent (like Table 5), as well as using a common exponent for multiple significant within a vertex, and among multiple vertexes (like Table 6).

The interpretation of the vertex data can be that each set of two consecutive vertexes would specify diagonal corners of a bounding box. In some implementations each additional vertex can be interpreted with the one preceding it, such that one additional vertex specifies another bounding box. For a discrete section or series of AABBs, a format flag or another indication can be provided as to what data is present for those AABBs, such that multiple formats can be used within a given scene.

Thus, according to aspects presented herein, when rendering a scene with ray tracing, both primitive data and GAD are used by an intersection testing resource for identifying a primitive, if any, first intersected by a given ray.

Rays

Similar to vertexes, rays also require origin information. Thus, in example BFP formats, a ray origin can be represented by an exponent shared among 3 significant, one for each directional distance from a scene origin. Table 8 illustrates one example of a ray data structure, and a number of bits for each component. Rays typically used with ITR 125 also have intersection information included that tracks a current shortest distance traveled to a first ray/primitive for that ray. This is relevant as ITR 125 may test rays out of scene traversal order, such that a second, farther primitive intersection may be identified before a true, first primitive intersection. In one implementation, 4 4-byte words can be used to store information for 1 ray, where distance traveled and origin exponent are grouped in 1 4 byte sequence.

TABLE 8

| Ray Origin | | | | Direction | | | Intersection Information | |
|---|---|---|---|---|---|---|---|---|
| Exponent | Significand | Significand | Significand | Direction | | | Information | |
| Shared | x | y | z | x | y | z | $t_{ee}$ | t |
| 8 bits | 16 bits | 16 bits | 16 bits | 16 bits | 16 bits | 16 bits | 8 bits | 15 bits |

There may be a number of situations where rays have origins that are reasonably close together. For example, rays may be generated for Monte Carlo sampling of a surface, and these rays may all have origins reasonably close together, and be defined relatively close in time. A BFP ray representation for such rays can include an exponent shared among a number of these rays. If the origins among the rays were exactly the same (e.g., sampling of an intersection point for occlusion of defined light sources), then the entire origin can be shared. BFP representations of rays need not employ a data structure like that of Table 8, and can include BFP origin data and ray directional information that can be used in a recursive ray tracer.

In introducing formats for rays, primitives, and GAD elements involved in intersection testing, examples and other considerations related to how these formats can help save memory space, reduce bandwidth requirements and computation requirements were also introduced. Any of the primitives and GAD elements can be considered also as geometric shapes, in that more generically they each represent shapes, such as triangles, spheres, boxes, etc. Also, subportions of these geometric shapes also can be considered geometric shapes, in that for example, a section of a sphere can be a circle, and a side of an AABB is a portion of a plane. Finally, objects used in intersection tests (rays and geometric shapes) can be considered to have attributes. For example, a sphere has a radius and an origin, a ray has an origin, a direction, and potentially other attributes, an AABB has attributes of an arrangement of planes, etc. Now, further explanation is provided concerning use of this data for intersection testing is provided with respect to FIG. 3.

Figure 3:
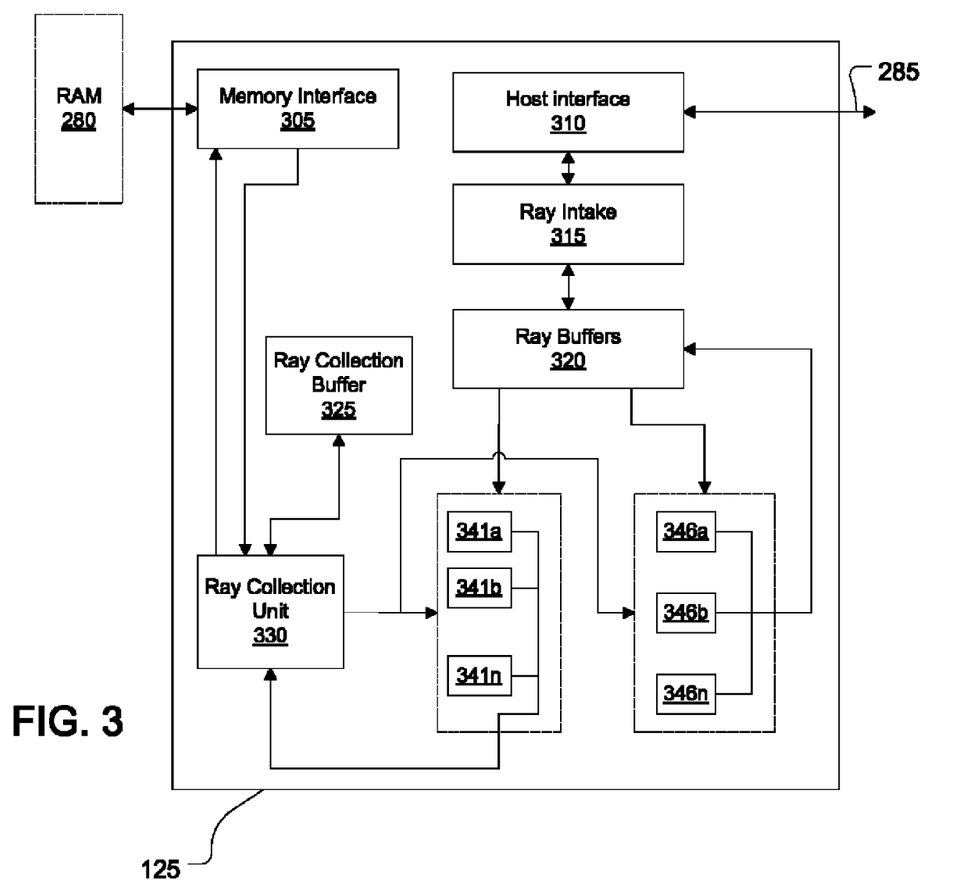
FIG. 3 illustrates an example intersection testing resource that may use block floating point formatted data.

FIG. 3 illustrates an example intersection testing resource (ITR) 125 (FIGS. 1-2) in more detail. ITR 125 includes a host interface 310 for interfacing with I/O Bridge 230 (e.g., over a PCI-E connection), and logically with driver 105. ITR 125 receives groups of rays from driver 105 to be intersection tested. For example, driver 105 can provide groups of camera rays to be tested. Incoming rays are processed at ray intake 315; such processing can include for example decompressing rays. Decompressing can include, for example, determining that certain rays were specified with a shared origin, and then decompressing would include constructing independent data structures for those rays to be stored in ray buffers 320. Output from ray intake 315 would generally include a data structure for each ray to be intersection tested. For example, each ray would be represented with a data structure according to Table 8, above.

Ray buffers 320 are for storing these data structures until a ray represented by a given data structure is to be tested for intersection. The intersection testing resource 125 is adapted for storing many such rays at a given time in order to increase parallelism of ray testing.

Each ray is generally first tested for intersection with geometric shapes comprising acceleration structures (e.g., spheres) that encompass various amounts of primitives. After testing the rays against some number of acceleration structures, a set of primitives, one of which may be first intersected by each is identified, and these geometric shapes are then tested. In intersection testing resource 125, a plurality of GAD test units 341a-341n for testing acceleration shapes (e.g., spheres) is provided along with a plurality of primitive test units 346a-346n.

Each test unit 341a-341n can test a GAD element with one ray, in one implementation, a plurality of rays in another implementation, or a plurality of rays with a plurality of GAD elements in a further implementation. Similarly. each test unit 346a-346n can test a primitive with one ray, in one implementation, a plurality of rays in another implementation, or a plurality of rays with a plurality of primitives in a further implementation.

In one example, each test unit 341a-341n tests an identified acceleration shape against a respective ray from a collection of rays provided to the test units 341a-341n under control of a ray collection unit 330. Ray collection unit 330 manages a plurality of ray collections stored in a ray collection buffer 325. A ray collection can include an identifier of a shape (e.g., a GAD element) and a list of rays (e.g., a list of ray identifiers) that are to be tested against geometric shapes identified based on a relationship with the identifier of the geometric shape.

In an example implementation, the shapes to be tested are identified based on a relationship to the identified geometric shape, such as being logically associated with the identified geometric shape in a hierarchical graph of GAD elements. The logically associated shapes are fetched (e.g., by a DMA transaction initiated by ray collection unit 330) through a memory interface 305 to a DRAM that can hold GAD elements and primitives for testing. Where the logically associated shapes are GAD elements, the DMA targets can be test units 341a-341n, and where the associated shapes are primitives, the DMA targets can be test units 346a-346n, or ray collection unit 330 can be the DMA target, and can distribute shapes appropriately to the test units.

Figure 3A:
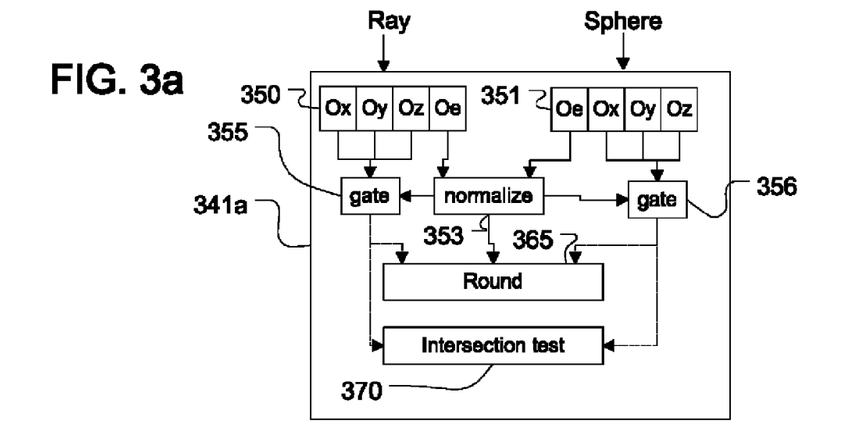

FIG. 3a illustrates an example test cell 341a in the context of a spherical geometry acceleration shape, with the understanding that description provided with respect to FIG. 3a can be applied to other acceleration structures and shapes, as well as to primitive testing. In FIG. 3a, data for a ray and a sphere are inputted to test cell 341a. The data for the ray includes an origin defined with three separate significant, each sharing a common exponent. The data for the sphere also includes an origin, also defined with three separate significant, each sharing a common exponent. The origins are submitted to a normalizer 353, where a larger exponent is determined, and the smaller exponent normalized to the larger. The significant associated with the smaller exponent are rounded to reflect the normalization, and therefore normalizer controls gates 355 and 356, which respectively control whether the ray significant or the sphere significant are sent to rounder 365, and which are provided directly to intersection test logic 370. In other words, only one set of significant needs to be rounded, and that set is provided to rounder 365, and the other set goes directly to intersection test logic 370. Thereafter, the intersection test logic 370 can complete an intersection test algorithm and return an indication of a detected intersection. Other implementations of such functionality are possible, for example, it was disclosed above that an exponent intermediate of two exponents could be selected as an exponent to be used in testing, and in such a circumstance, more than one normalization/rounding operation may be performed. In some situations, the term normalizing may be used to refer both to selection of an exponent and conforming significant of interest to that exponent (i.e., normalizing also would include the rounding operation above). Usage of such terminology also falls within the scope of these examples.

Depending on an implementation test cells 341a-341n and test cells 346a-346n can represent any of a variety of compute resources used as test cells, including examples of fixed function cores, and programmable cores or other processing elements executing threads or processes for performing intersection testing. These elements also can represent, in some implementations, threads executing on a multithreaded processor or group of multithreaded processors, or a processor virtualized into multiple processors, and the like.

Figure 4:
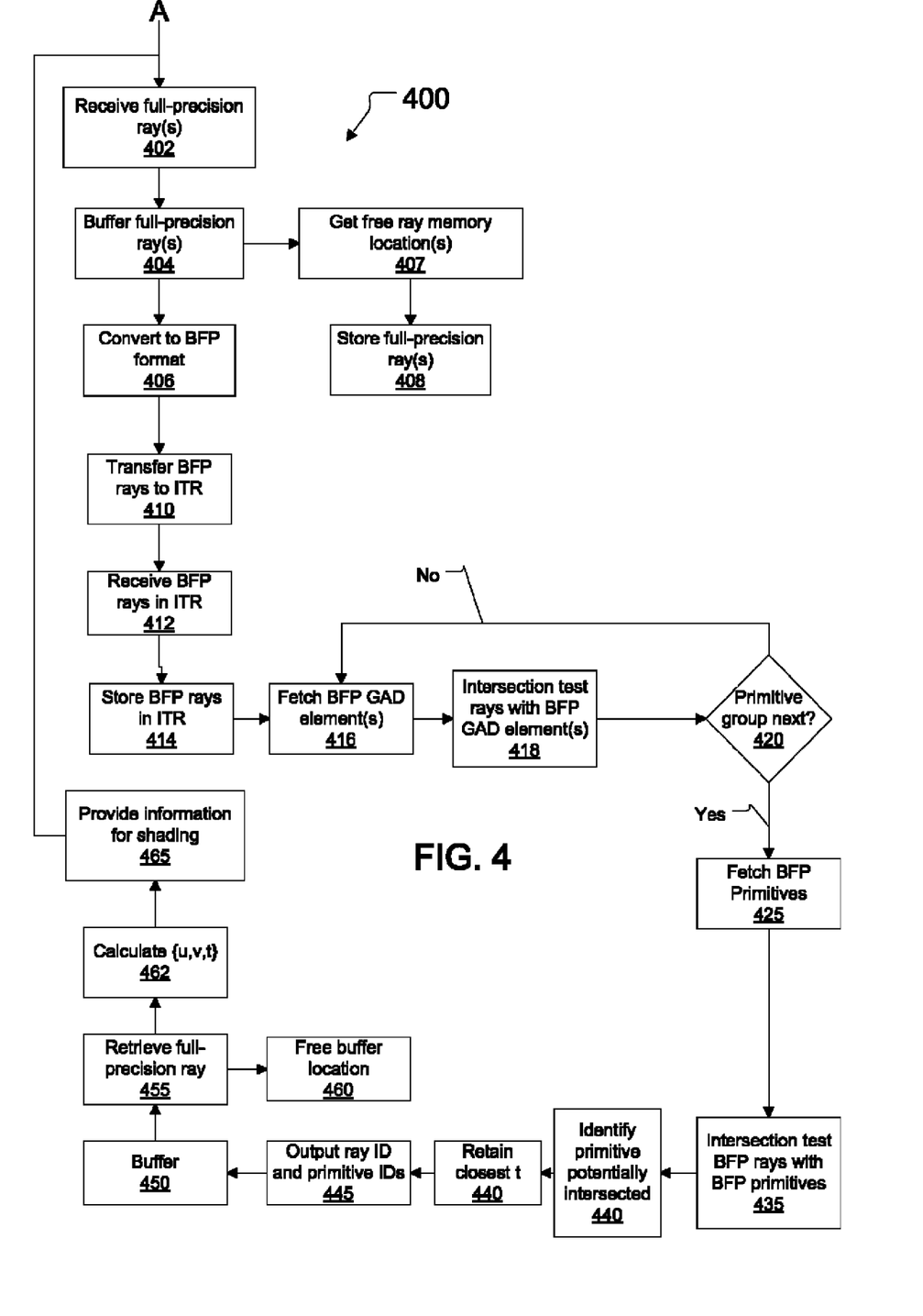
FIG. 4 illustrates an example method comprising method aspects of a driver and of an intersection testing resource using block floating point data.

FIG. 4 illustrates steps of an example method 400 including operational aspects both of driver 105 and ITR 125. Method 400 may provide a large scale intersection testing resource to a more general purpose CPU through an appropriate software interface. Method 400 provides for such parallelized intersection testing in a way that allows largely operation of intersection testing resource 125 to proceed independently of involvement by driver 105 or other functionality operating on host CPU 205. By example, intersection testing resource 125 can maintain state for and testing portions of about 10,000 rays at a time. This large scale ray tracing resource calls for performing functions and/steps that would not be considered relevant in host CPU ray tracing, or other hardware accelerated testing, where a relatively small number of rays are "in flight", complete, and are replaced with different rays.

Method 400, driver 105 receives 402 rays in a full-precision format from an application requiring rendering services. Driver 105 buffers 404 (e.g., in a FIFO buffer) the full-precision rays, and obtains 407 free memory locations to store the full-precision format rays, such as locations in a reserved section of main memory, and stores 408 these full-precision rays in respective memory locations. Free locations can be obtained from a replenished stack, as described further below. In some examples, an address of the location of the ray in memory can be used as an identifier for the ray, such that the identifier can be passed as a reference rather than transferring the ray data itself.

Driver 105 converts 406 the full-precision rays to a BFP format, such as example BFP formats for rays described above, or another format, as appropriate. The BFP format rays can be buffered during transfer 410 to ITR 125 to handle the large quantity of rays desired. ITR 125 receives 412 the BFP format rays, and stores 414 them.

In an example ITR 125, testing of rays begins by testing the rays first with GAD element that can be for example, root nodes of a tree of related GAD elements. The rays can be grouped of rays can be tested for intersection with a sequence of GAD elements. For example, a group of rays can be associated with a GAD element, and rays of that group can be tested for intersection 418 with a sequence of GAD elements or primitives starting at a memory location identified in data related to that GAD element. Often, a number of GAD elements are tested for intersection before a ray finds itself grouped with rays ready to be tested for intersection with primitives. A decision 420 determines when a ray group is ready to be tested for primitive intersection (for example, based on a flag associated with a GAD element associated with the group). If the next geometric shapes to be tested for that ray group are GAD elements, then those elements are fetched 416 and tested 418. If primitives are next to be tested, then those primitives are fetched 425 and tested 435 for intersection with the BFP format rays. A distance traveled (known as "t") is tracked in each ray data structure for a respective identified possible intersection. Each time a potential intersection is identified, a distance traveled to a previously identified intersection is compared, and a closest intersection is retained 440.

After identifying a closest ray/primitive intersection, an identifier for the ray and an identifier for the primitive are outputted 445. These identifiers are buffered 450. Based on the ray identifier, a full-precision ray is obtained from its storage location (e.g., the ray identifier can be used to identify a memory location for the full-precision ray, or can be derived from the memory location, or vice versa). After retrieval 455 of the full-precision ray, the memory location storing that information can be freed 460, to allow reuse of that location for another ray to be submitted for testing to intersection testing resource 125.

In method 400, because of the large number of rays tested, ray identifiers are passed between intersection testing resource 125 and driver 105. By contrast, typical ray tracing would also return other information useful for shading that is created during intersection testing. For example, it is necessary that a closest intersection be identified for a given ray, and this usually involved identifying a smallest distance traveled (t) for that ray before an intersection. The distance traveled can be useful in shading algorithms. Also, some intersection testing methods, e.g., barycentric coordinates, also provide other information useful in shading, such as the 2-D projected coordinates (u,v). Since this information is calculated during intersection testing, it is usually obtained "for free" from the intersection testing process.

Since ray identifiers are passed, driver 105 can use the full-precision ray specification and primitive specifications obtained from intersection testing resource 125 to calculate 462 the {u,v,t} for that intersection. In other words, driver 105 can "redo" the intersection test for only that ray and that primitive so that the driver 105 can provide 465 the {u,v,t} and other information, as necessary or desirable, to a shading routine. In this fashion, bandwidth at the interface 285 between driver 105 (i.e., through hardware of system) and intersection testing resource 125 is conserved, even though it can result in more overall calculations, and even redundant calculations, being performed.

For purposes of providing a convenient example, a "driver" was identified as performing various functions in the preceding paragraphs. However, from the present description it should now be apparent these functions can be provided in a variety of ways in different implementations. For example, how these functions are provided can vary depending on how the BFP testing functionality is provided, and there can be more native support for controlling BFP testing functionality, or such functionality can be provided in development kits, or integrated into applications, or other ways appropriate for the particular situation. For example, if test cells were programmed into or provided with (e.g., integrated or bundled) with host processor functionality, then driver-type functionality can be provided natively in the system or combination.

Test Cells and Intersection Testing with BFP Format Data

Algorithms for testing for intersection between a ray and a triangle include using plane equation techniques, 6D Plücker space techniques, and barycentric coordinates techniques. Intersection testing between a ray and a sphere also is known and can involve formulating a quadratic equation from a definition of a sphere (origin and radius) and a definition of a ray (direction and origin), then solving for the discriminant of that quadratic to determine whether real roots exist for it. Other optimizations, such as normalizing a sphere to unit radius can be provided. Intersection testing AABBs can be accomplished by testing planes of the AABB for ray intersection, and handling cases such as where a ray is parallel to an AABB. As there are a variety of techniques for intersection testing of GAD elements and primitives, which can be selected based on implementation-specific considerations, all these techniques are not detailed. Also, other techniques can be realized for such intersection testing, and BFP techniques disclosed herein can be applied to such techniques based on these disclosures.

Concerning a particular example involving a ray/sphere intersection tester, test cells 346a-346n can be implemented to use BFP format input data as follows. Assuming that a ray ($R_1$) is defined in parametric form as $R_1(t)=O+Dt$, where O represents a 3-D origin, D is a unit direction vector, and t is the parameter that varies to specify the ray in space. In example BFP ray implementations, the origin O is representable by three separate significant for each independent direction, and a shared exponent. Thus, determining whether $R_1$ intersects with a given sphere, a discriminant can be formed and solved to determine whether it has any real roots. If there are no real roots, then there is no intersection. If using full-precision floating point representations of this data, then each respective component of the origin of the sphere and of the ray would be separately normalized and rounded before additional processing would occur. In a hardware implementation, this normalization would occur either in separate hardware units or in a pipelined sequence within a hardware unit. In a BFP format example, because an exponent is shared among the component directions of a ray origin and another exponent is shared among the component directions of the sphere, only one normalization and rounding is done for those two exponents.

In other implementations, exponents can be shared among additional data elements. For example, a sequence of rays sharing an origin, or having a similar origin (e.g., rays generated for a shading effect, like determining whether a given intersection point is in shadow of enumerated light sources) can each share one exponent, such that all components of each origin share an exponent that also is shared with components of other origins.

Figure 5:
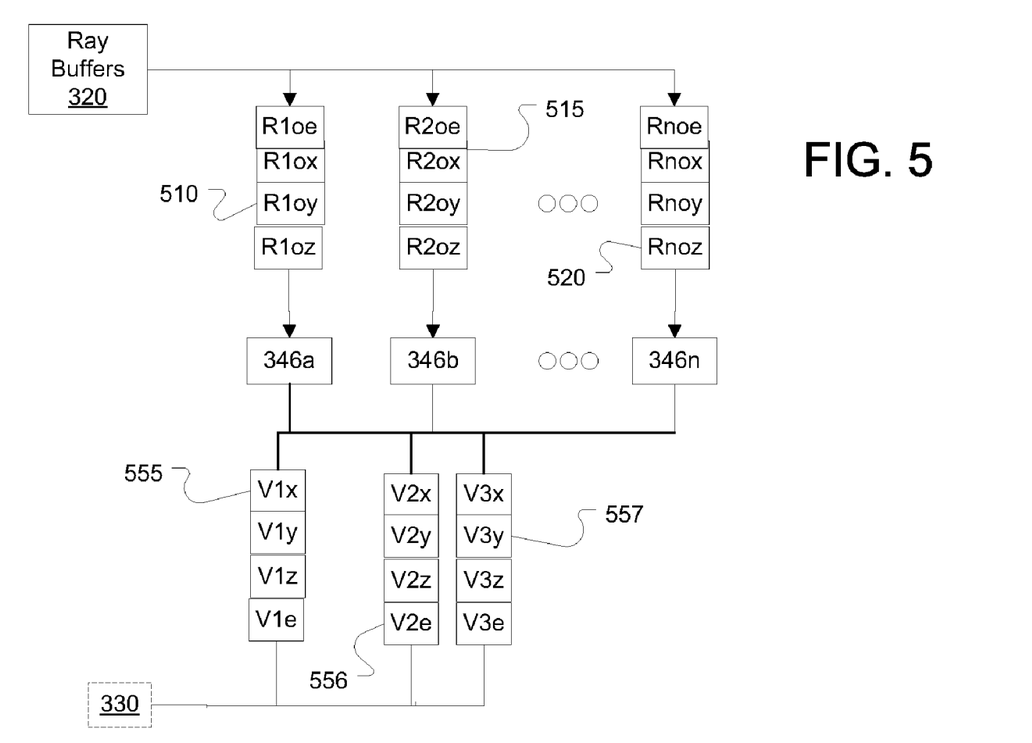
FIGS. 5-7 illustrates example of ray and primitive data formatting and flow to test cells.
Figure 6:
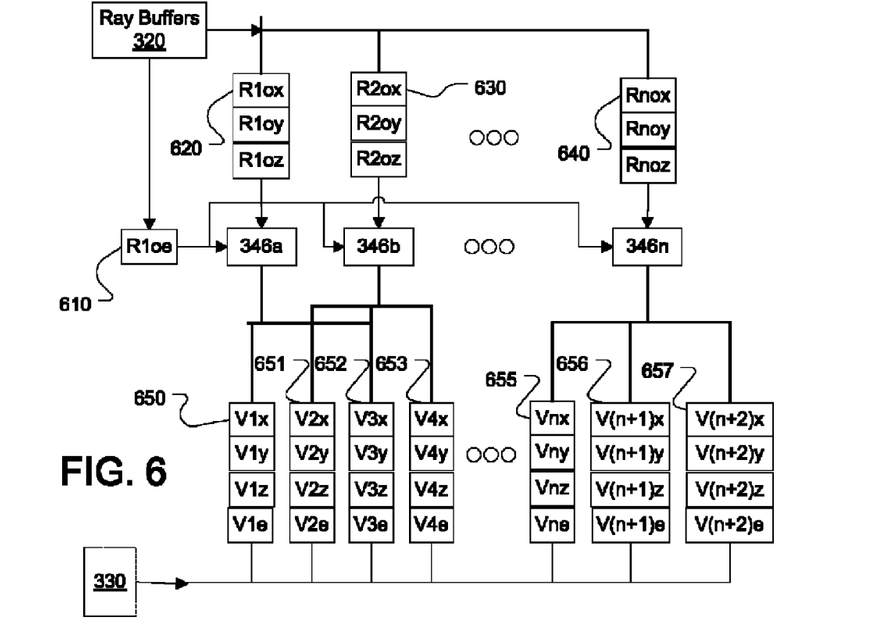
Figure 7:
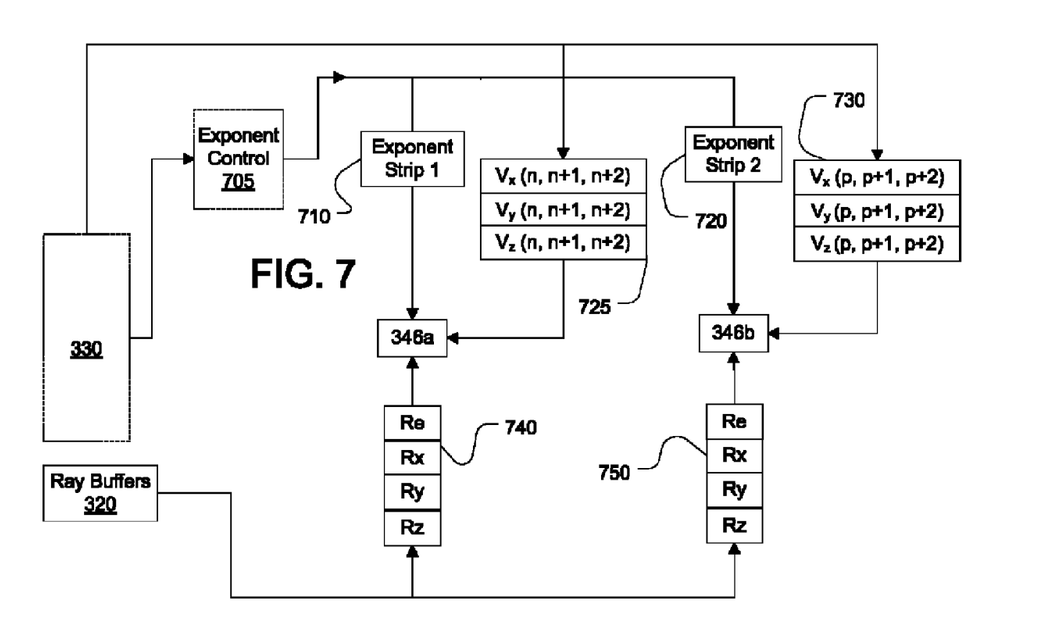

Examples of how ray data and geometric shape data can be provided from storage within ITR 125, from other memories, and from driver 105 through interface 285 are presented with respect to FIGS. 5-7. FIGS. 5-7 are illustrated from the perspective of primitive testers, although disclosures in this context are to be understood as application also to GAD element (e.g., sphere) testers, such as test cells 341a-341n.

FIG. 5 illustrates an example where ray buffers 320 (FIG. 3) provide a distinct ray (R1-Rn representing a first, second and an nth ray) to each of n different test cells. In FIG. 5, only data for the ray origins are shown (elements 510, 515, and 520 respectively for ray origins 1, 2 and n) to illustrate the use of BFP format data for such origins, with the understanding that other data, such as direction vectors can also made available to the test cells. Each ray origin is represented as a shared exponent and three significant (R1oe, R1ox, R1oy, R1oz 510 respectively are the exponent and significant for ray 1, and 515 and 520 represent the exponent and origins for rays 2 and n, respectively). In particular, vertexes 1, 2 and 3 (555, 556 and 557) are each provided to test units 346a-346n, such that each test unit will be testing a different ray (origins 510, 515, 520) for intersection with a primitive formed from those three vertexes.

In this example, the vertexes composing triangles being tested are shown to be originating from ray collection unit 330, showing that ray collection unit 330 may initiate or cause to have initiated a DMA transaction that obtains triangle data from memory 280 (FIG. 3.) Depending on the format of such data, ray collection unit 330 may provide some intermediate processing of that data, determine a more granular destination for it, buffer it, or pass it through to test cells, or some combination thereof. Each portion of 510, 515, 520 can represent a register where data can be stored, and/or that such data is being communicated according to the interconnections illustrated. For example, each test cell 346a-346n can be configured to read such data from appropriate registers, in response to a signal, or each test cell 346a-346n can latch data transmitted to it, and determine when valid data is received and testing can begin. Likewise vertexes 555, 556, 557 can be stored in registers to be read by each test unit, or can be transmitted for storage in separate registers in each test cell 346a-346n.

FIG. 6 illustrates another example, where ray buffers 320 provide origin information (and direction information, not illustrated) for rays 1, 2, and n to test cells 346a-346n. Here, these rays are represented with a shared exponent 610 and respective separate significant 620, 630, and 640. Shared exponent 610 thus applies to each significand of each ray (i.e., x, y, z for each of 620, 630, and 640). This implementation allows memory storage savings compared with a separate exponent for each ray, may be appropriate for example, in a software-controlled implementation, since certain groups of rays may have a similar origin, but it may be undesirable to "hardwire" a common origin exponent to a large number of ray testers.

FIG. 6 also illustrates that different vertexes can be tested in each test cell 346a-346n and that data for the vertexes can be provided in an overlapping fashion to the test cells. For example, vertexes 650, 651, and 652 are provided to test cell 346a, vertexes 651, 652, and 653 are provided to test cell 346b. In a hardware implementation, this implementation can save routing as test cells can be collocated in such a way that independent routing need not be provided for three vertexes to each test cell.

FIG. 7 illustrates aspects that can be provided in further variations, including where different rays are provided to different of the test cells, and where different primitives are provided to each test cell, such that each test cell can test a distinct ray against different primitives. For clarity, only test cells 346a and 346b are illustrated, but it would be understood that more or fewer test cells can be provided in a particular implementation, as evidenced by the 1-n numbering used with previous figures for such test cells.

FIG. 7 illustrates an implementation where test cell 346a can test primitives of a first triangle strip and test cell 346b can test primitives of a second triangle strip. Exponent control 705 operates to determine an exponent provided to test cell 346a, such as by latching of data on transmission lines, or by storage in a register for test cell 346a to read when required. As described above, an exponent for primitives of a triangle strip can be constant for a period and then change. Exponent control 705 determines when to change the exponent 710 presented to test cell 346a. Also, vertexes for the primitives of the triangle strip are provided from ray collection unit 330 (as discussed, can be a DMA transaction from memory 280, or may involve intermediate processing by ray collection unit 330). If test cell 346a is to test each primitive of a triangle strip, and each subsequent primitive of a triangle strip builds on previously used vertexes, an additional vertex can be provided to test cell 346a for each subsequent primitive tested.

Thus, 725 represents information comprising the x, y, and z components for each of the n, n+1, and n+2 vertexes.

Similarly, test cell 346b receives exponent 720 for a second triangle strip (or for a number of primitives in the strip determined by exponent control 705), 730 represents x, y, and z components of each of the p, p+1, and p+2 vertexes forming a primitive next to be tested by test cell 346b. 740 and 750 represent a generalization of presentation of rays to each of test cells 346a and 346b. In some implementations, a different ray can be presented to each of test cells 346a and 346b, such that the respective ray can be tested against the primitives of a different triangle strip. In other implementations, each ray 740 and 750 can be cycled such that a group of rays can be tested against each primitive of each separate triangle strip. Rays can be streamed from ray buffers 320 in synchronization to latching reads by each test cell 346a and 346b.

From the above description, it can be discerned that using a BFP format for data used in ray/geometric shape intersection testing results in savings of both memory space for storing a large number of rays, but also in reductions in the amount of processing capability (e.g., having fewer gates and/or fewer operations and/or fewer pipeline stages) required to perform a given intersection testing algorithm than if using full-precision floating point data. Thus, test cells using BFP format data having a given throughput can be provided in a smaller silicon area, and more test cells may be provided within a given amount of space.

In all of the above description, results of systems and methods include determinations of potential intersection results of rays with geometric shapes, including acceleration structures, and primitives that compose a scene. These intersection results can be used to simulate interaction of light and other directed electromagnetic energy, such as infrared radiation, with physical objects. As such, intersection testing of rays with primitives can be a predicate to a result of determining a final rendering of a scene to display, when that is a desired objective, but the intersection testing results themselves can provide concrete and physically meaningful information, aside from a potential final render product, which can be outputted, stored, or otherwise used.

From the above description, it can be discerned that in a specific implementation, exponents can be shared amongst different kinds and amounts of data, such as sharing only within component directions of a vertex, among all the vertexes of a primitive, within the component directions of a sphere or ray origin, within a number of sphere or ray origins, etc. The software and/or hardware implementing the BFP testing in that implementation would be adapted accordingly. For example, certain BFP formats may be useful primarily in a software configuration, e.g., sharing an exponent for origins of a number of rays, where providing a permanent routing configuration for that format may not be desirable, but it may occur regularly enough to present a worthwhile optimization in software. Other BFP formats and optimizations can be ascertained or implemented from the various examples presented herein.

Such other formats and optimizations can be implemented in a principal example and application having using a relatively large number (e.g., 32 GAD testers and 32 primitive testers) of test cells provided in custom hardware, many variations and implementations of the BFP aspects disclosed here are possible. Other formats and optimizations can be implemented in systems and/or software having different configurations, as described with respect to FIGS. 8-10, where each of the example systems disclose variations in the amount of coupling or involvement of a main general purpose processor in intersection testing.

Figures 8, 9, 10:
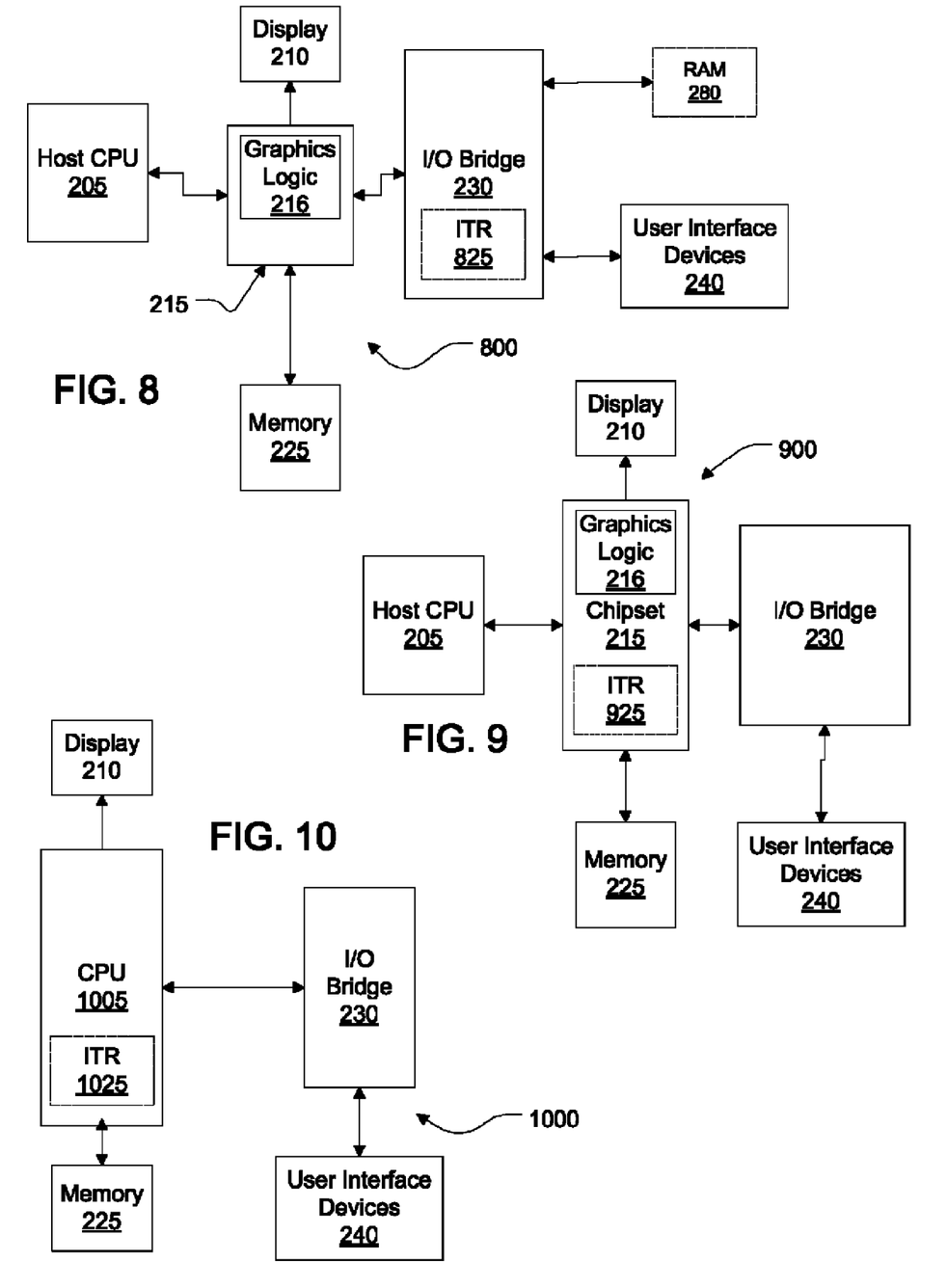
FIGS. 8-10 illustrate examples of implementations of intersection testing resources, and supporting functionality for using block floating point format data in ray/geometric shape intersection testing.

The system implementation of FIGS. 2-3 illustrated an example where the intersection testing resource 125 can intersection test a large number of rays and geometric shapes without software control. In FIG. 8, a first example alternative system 800 includes an intersection testing resource 825 provided within a chip that may primarily be devoted to I/O activities (I/O bridge 230). Integrating an ITR 825 within I/O bridge 230 can reduce a latency to initiate intersection testing by allowing ITR 825 to be a component addressable by a processor without performing a PCI transaction, for example. It may still be the case, however, that an additional memory for storing data required by ITR 825 can be provided via an expansion port, such that data can be streamed to ITR 825 without arbitrating for access to the main system memory. In some examples, ITR 825 can be streamed data from chipset 215 which it accessed from memory 225.

Another example is system 900 illustrated in FIG. 9. In system 900, Intersection Testing Resource 925 is located in chipset 215. Chipset 215 can include graphics logic 216, which in conventional systems can include hardware for performing calculations useful for rasterization-based rendering and for shading. Chipset 215 thus can be adapted for performing ray tracing based rendering using intersection testing resources according to present examples, represented as ITR 925. ITR 925 can, for example, a number of test units for geometric shapes including primitives and acceleration shapes that is selected based on a desired performance level of graphics implemented in the chipset, and other considerations such as cost, power consumption, and the like. For example, in a higher performance/higher cost graphics system, such as for gaming, ITR 925 may include more test cells than an entry-level implementation. A different alternative having similarities to aspects illustrated in FIG. 9 is a further example where graphics logic 216 and ITR 925 are provided together, potentially in a discrete chip, and potentially interfacing with the chipset 215 or the host CPU 205 via an expansion connection, such as PCI express, a bus or another suitable interface. Also, ITR 925 may share a graphics memory with graphics logic 216, and this memory may be separate from main memory 225, including a virtual separation, as well as dedicated read and write ports for graphics related accesses.

FIG. 10 illustrates an example where an intersection testing resource 1025 is integrated into CPU 1005. In this example, ITR 1025 may comprise some number of shape testers (i.e., testers for shapes representing primitives and/or acceleration shapes) and other functionality implemented in hardware in FIG. 3, except for storage functions, can be managed/implemented in software. In such an example, the shape testers can function largely as computation resources to which specific tasks are allocated tasks. For example, disclosed examples of shape testers using BFP data would require fewer operations to complete a given intersection test than would a general purpose full-precision floating point unit. As such, some number of shape testers could be provided in additional to one or more general purpose FP units, such that CPU 1005 could allocate intersection tests to the shape testers and other floating point computation to the general-purpose FP units. CPU 1005 also can be tailored for a given target market by including more shape testers for higher performance, or for a CPU designed for graphics operations (e.g., CAD or gaming, a dedicated processor for a gaming console, a dedicated co-processor for a more general purpose computer, and the like. For example, in a multi-core chip, a CPU 1005 can be provided along with a more conventional CPU 205. Primitives can be provided that can use the shape testers in an optimized manner such that programmers do not have to write code specifically for using the shape testers.

The above figures presented various examples and implementations of a plurality of intersection testers that can test a geometric shape for intersection with a ray. In some cases, these intersection testers were implemented in hardware, and they can also be implemented in software, or in hardware units configurable for particular test algorithms, including for particular shapes.

Generally, examples of systems were presented where rays and geometric shapes to be tested were both specified for testing in a block floating point format. However, benefits can be realized by using either rays or geometric shapes specified in block floating point format, while the other can be provided in regular format, with a separate exponent for each significand.

Also, examples presented generally related to performing intersection testing for a given set of primitives and/or acceleration shapes (e.g., the primitives and shapes for 1 scene of a series of scenes) in BFP format. However, it also is possible that some portion of these geometric shapes (i.e., primitives and/or acceleration shapes) can be tested in full-precision floating point while other portions are tested in a BFP format. For example, where a system comprises a general purpose CPU and one or more BFP test cells according to any of the examples and other aspects presented, then the general purpose CPU may have one or more floating point units that can assist in intersection testing and a driver or other management functionality can divide rays to be intersection tested among any of the available testing resources (i.e., the FP units of the general purpose processor and the test cells). So, it also should be apparent that no disclosed example precludes such implementations.

Physically, the components of various systems and system components described and illustrated herein can be fabricated as a monolithic integrated circuit, or can include multiple discrete pieces of silicon that communicate within a package and/or by interconnection on a circuit board. For example, a high-performance CPU for gaming may include an intersection testing resource on a separate piece of silicon integrated into a multichip module with a CPU.

Software for implementing configurations and methods described and/or claimed may be executed in a special purpose or general-purpose computer. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, pagers, and the like.

The above description mostly involved examples of BFP formats, hardware and software localized within server, a workstation, a gaming console, a personal computer, and the like. However, these systems can exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like. Other pertinent information, such as data for processing, intermediate and final results, can also be stored on such media.

In this description and in the following claims, a system may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Although some subject matter may have been described in language specific to examples of structural features and/or method steps, it is to be understood that the subject matter defined in the appended claims is not necessarily limited to these described features or acts. Rather, the described features and steps are disclosed as examples of components of systems and methods within the scope of the appended claims.

We claim:

1. A machine-implemented method of intersection testing for ray tracing, comprising:
    accessing ray data defining a ray from a non-transitory machine readable medium;
    accessing geometric shape data, from a non-transitory machine readable medium, defining a position of a geometric shape in a 3-D scene, the geometric shape data being in a Block Floating Point (BFP) format comprising a plurality of significands sharing a common exponent, the plurality of significands being one or more of significands associated with a single vertex defining the geometric shape, and significands associated with a plurality of vertexes defining the geometric shape, wherein the geometric shape is one or more of a primitive defining an object in the 3-D scene and an element of an acceleration structure used for intersection testing rays in the 3-D scene;
    testing, by a processor, the ray for intersection with the geometric shape based on the ray data and the geometric shape data; and
    outputting an intersection result in response to the testing indicating a possible intersection of the ray with the geometric shape.

2. The machine-implemented method of claim 1, wherein the geometric shape is a primitive, and the intersection result includes an identifier for a ray and identifying information for the primitive that potentially first intersects the ray, and further comprising identifying a full-precision specification for the identified ray and using the full-precision specification for the identified ray for shading.

3. The machine-implemented method of claim 2, further comprising performing the shading in a processor configured by computer executable instructions.

4. The machine-implemented method of claim 1, further comprising:
    maintaining a higher-precision floating point format representation of the geometric shape in a memory; and
    converting representations of the geometric shapes from the higher-precision format into the block floating point format.

5. The machine-implemented method of claim 4, further comprising maintaining the higher-precision floating point format representation of geometric shapes in a memory accessible to a host processor, and further comprising storing the block floating format data for retrieval by an intersection tester to perform the testing.

6. The machine-implemented method of claim 1, wherein a management process executes on a host processor, and maintains a higher-precision floating point format representation of geometric shapes in a memory accessible to the host processor, and further comprising converting the higher-precision floating point format representation of geometric shapes to produce the block floating format data to be accessed by an intersection tester.

7. The machine-implemented method of claim 1, wherein the geometric shape data comprises a plurality of vertexes, each vertex specified by three distinct significands and an exponent in common with the three significands.

8. The machine-implemented method of claim 7, wherein the plurality of vertexes represent one or more of a triangle primitives and an axis-aligned bounding box.

9. The machine-implemented method of claim 1, wherein the geometric shape data comprises data for a plurality of axis aligned bounding box acceleration elements each bounding selections of scene primitives, and defined by at least one set of three mantissas, sharing a common exponent, and wherein each of the mantissas is associated with a different axis of the axis aligned bounding box and the method further comprises testing the ray for intersection with the axis aligned bounding box using the at least one set of three mantissas sharing the common exponent.

10. A ray tracing system comprising:
    a converter to convert geometric shape data, read from a non-transitory medium, the geometric shape data defining at least one point in 3-D space with three floating point components expressed as three exponents and three signficands, and to convert the geometric shape data for the at least one point into converted geometric shape data in a Block Floating Point (BFP) format comprising a plurality of significands and one exponent shared among the plurality of significands, the plurality of signficands being one or more of significands associated with a single vertex defining the geometric shape, and significands associated with a plurality of vertexes defining the geometric shape, wherein the geometric shape is one or more of a primitive defining an object in the 3-D scene and an element of an acceleration structure used for intersection testing rays in the 3-D scene; and
    an intersection tester coupled to the converter for receiving the converted geometric shape data and further operable to read, from a non-transitory medium ray data defining a ray to be intersected tested with the geometric shape, to determine an intersection test result based on the ray data and the converted geometric shape data, and to output an indication of a result of intersection testing.

11. The ray tracing system of claim 10, wherein the converter is further operable to store the converted geometric shape data in a non-transitory memory, to which the intersection tester is coupled for receiving the converted geometric shape data.

12. The ray tracing system of claim 11, wherein the system further comprises a host processor operable to execute code for applications, and the non-transitory memory is a segment of graphics memory separate from memory used by the host processor.

13. The ray tracing system of claim 10, wherein the converter is further operable, in response to an indication that the geometric shape for that geometric shape data is to be tested, to retrieve the geometric shape data defining at least one point in 3-D space with three dimensional components expressed as three exponents and three significands from a memory for conversion into the converted geometric shape data.

14. The ray tracing system of claim 10, wherein the converter is implemented in a driver for execution on a host processor, wherein the geometric shape data in a non-transitory memory accessible by the host processor.

15. The ray tracing system of claim 10, wherein the geometric shape data includes a plurality of spheres, each sphere bounding a selection of the geometric primitives, and defined in part by an origin, and converted geometric shape data for the origin comprises an exponent shared among three significands.

16. The ray tracing system of claim 10, wherein the geometric shape data comprises vertexes for defining one or more of axis-aligned bounding boxes and primitives, each vertex positionally specified with respect to a scene origin with converted geometric shape data comprising three significands for each of three directional measurements with respect to the scene origin and one exponent shared among the three significands.

17. A machine-implemented method of intersection testing for ray tracing, comprising: accessing, from a non-transitory medium ray data defining a ray in a three-dimensional (3-D) space, accessing, from a non-transitory medium geometric shape data defining a geometric shape, wherein the geometric shape comprises an axis aligned bounding; box, one or more vertexes of the axis aligned bounding box having a location in the 3-D space determinable from Block Floating Point (BFP) format data in the geometric shape data comprising a plurality of significands that share the same exponent; testing the ray for intersection with the geometric shape, in a tester, based on the accessed ray data and geometric shape data; and outputting an intersection result in response to the testing indicating a possible intersection of the ray with the geometric shape.

18. The machine-implemented method of claim 17, wherein the geometric shape data further comprises a primitive, and the intersection result further includes identifying information for the primitive if found to potentially intersect the ray, and further comprising identifying a full-precision specification for the identified ray and providing the full-precision specification for the identified ray to shader code.

19. The machine-implemented method of claim 18, further comprising the shader code returning secondary rays for intersection testing in a full-precision floating point format; and converting the full-precision floating point format for the secondary rays into a block floating point format representation.

20. The machine-implemented method of claim 17, further comprising, in a management process for the intersection tester:

maintaining a higher-precision floating point format representation of the ray to be intersection tested with the geometric shape; and converting the higher-precision floating point format representation of the ray into a block floating point representation in which a location of the ray in the 3-D space is specified by a plurality of mantissas sharing a single exponent.

* * * * *